INVENTOR:
Joseph GRECO

Aug. 19, 1969  J. GRECO  3,461,823
MACHINE FOR PRODUCING ICE CREAM CONES, BAKERS' CUPS
OR LIKE EDIBLE CONTAINERS
Filed Feb. 27, 1967  9 Sheets-Sheet 4

INVENTOR:
Joseph GRECO
BY
Abraham A. Saffitz

INVENTOR:
Joseph GRECO

Aug. 19, 1969     J. GRECO     3,461,823
MACHINE FOR PRODUCING ICE CREAM CONES, BAKERS' CUPS
OR LIKE EDIBLE CONTAINERS
Filed Feb. 27, 1967     9 Sheets-Sheet 7

INVENTOR:
Joseph GRECO
BY

INVENTOR:
Joseph GRECO
BY
Abraham A. Saffitz

United States Patent Office 3,461,823
Patented Aug. 19, 1969

3,461,823
MACHINE FOR PRODUCING ICE CREAM CONES, BAKERS' CUPS OR LIKE EDIBLE CONTAINERS
Joseph Greco, 17 Thorne Lane, Leeds 8, England
Filed Feb. 27, 1967, Ser. No. 618,920
Int. Cl. A21b 5/00
U.S. Cl. 107—58                                    17 Claims

ABSTRACT OF THE DISCLOSURE

A machine for continuously moulding and cooking a batter or mix to produce ice-cream cones, cups, or like edible containers, wherein a series of mold sets comprising inner moulds and split outer moulds are mounted in pairs of opposed mould carriers around the circumference of a drum which is rotated continuously around a horizontal axis while the mould sets are successively filled with mix, heated internally of the drum to cook the mix, opened to eject the cones and closed ready to receive a further charge of mix, all in timed relation to the rotation of the drum. The opening and closing of the mould carriers are effected by sets of ram and cylinder assemblies mounted between them, the inner moulds being axially movable against spring pressure relative to the outer moulds to act as a valve through which the mix is injected under pressure. The ejection of the cooked cones is effected by actuation through ram and cylinder units of ejector members surrounding the inner moulds, the injection of mix being effected by a pump mechanism located within the drum and whose discharge nozzle is held in engagement with each circumferentially succeeding mould inlet in turn during a small portion of the revolution of the drum, the pump itself being bodily and continuously rotated and having a plunger for injecting a measured quantity of mix from a supply thereof at each injection.

---

This invention relates to a machine for producing ice-cream cones, bakers' cups or like edible containers which are moulded from batter or other suitable mixture, which will hereinafter be termed the "mix," and are cooked in said moulds. The invention aims at enabling such containers to be produced in large quantities on a continuous system which involves the automatic repetition of a sequence or cycle of operations.

Broadly described, the machine according to the invention includes a drum or cylindrical cage which carries around its circumference a series of mould sets comprising inner moulds or cores and split outer moulds or mould halves and which has power driven mechanism for rotating it continuously, heating provisions for said moulds, means for opening and closing said outer moulds, means for feeding mix to said moulds, means for ejecting the cooked containers from the moulds, and mechanism and control devices therefor arranged to cause the operation of all said means in predetermined sequence and time relationship whereby the continuous production of containers can proceed automatically so long as the supply of mix is maintained.

An important feature of the invention is the manner of mounting such outer moulds in the machine referred to above and means for guiding and operating the mould halves. According to this feature the mould halves are arranged in two rows extending respectively along the opposed faces of two mould carriers which are mounted between a bedplate and an upper guide plate, said plates extending parallel to said carriers and transverse to the path of travel of the mould assembly, there being provided two or more sets of ram and cylinder assemblies, at least one set being for opening the moulds and at least one set being for closing the moulds, with means for conducting to said sets compressed air or other pressurised fluid and means for controlling their action so as to open and close the moulds at predetermined times related to the rotary movement of the drum or cage.

In operating the machine of this invention the mix has to be introduced to the space between the outer moulds or mould halves and the inner moulds or cores, and the cooked cones or the like have to be ejected when the moulds are opened, all in correct timed relationship to the movement of the drum or cage and the opening and closing of the moulds. A further important feature of the invention consists, therefore, in mounting each inner mould or core upon a bedplate or other support so as to be axially movable to open or close a mix inlet through which the mix can be forced, the core being spring-urged into the closed positions and acting as a valve. The core may itself work to a seating. Thus the mix is injected past the base of the core, and preferably the mix inlet is arranged to be connected intermittently with the mix supply so as to be charged during a small portion of the revolution of the drum or cage carrying the mould sets.

In order to enable the machine to operate continuously, the mix must be introduced into each set of moulds at the correct moment while they are in motion with the drum carrying them, and this requires a suitable construction and arrangement of pump mechanism. According to a feature of this invention this pump mechanism includes a plunger pump arranged to be rotated bodily so that its discharge nozzle or outlet can temporarily connect with the inlet opening of the moving mould during a minor portion of the pump's revolution, and actuator means for actuating the pump plunger to feed the predetermined quantity of mix under pressure to said mould during the short time the pump and receiver are thus connected, said actuator means including a rotary cam device which is arranged to be driven in timed relationship to the rotation of the pump and which has a radially movable spring-loaded thruster device arranged for rotation within a cam guide ring or compressor spiral, whereby said thruster device is constrained during most of each revolution by said guide ring or spiral but is released momentarily throgh a gap in the latter to actuate the pump plunger substantially instantaneously and is thereafter guided back into said guide ring or spiral to cause reloading of said thruster device spring.

In order that the invention may be fully and clearly understood the same will now be described with reference to the accompanying drawings, wherein.

Figure 1:
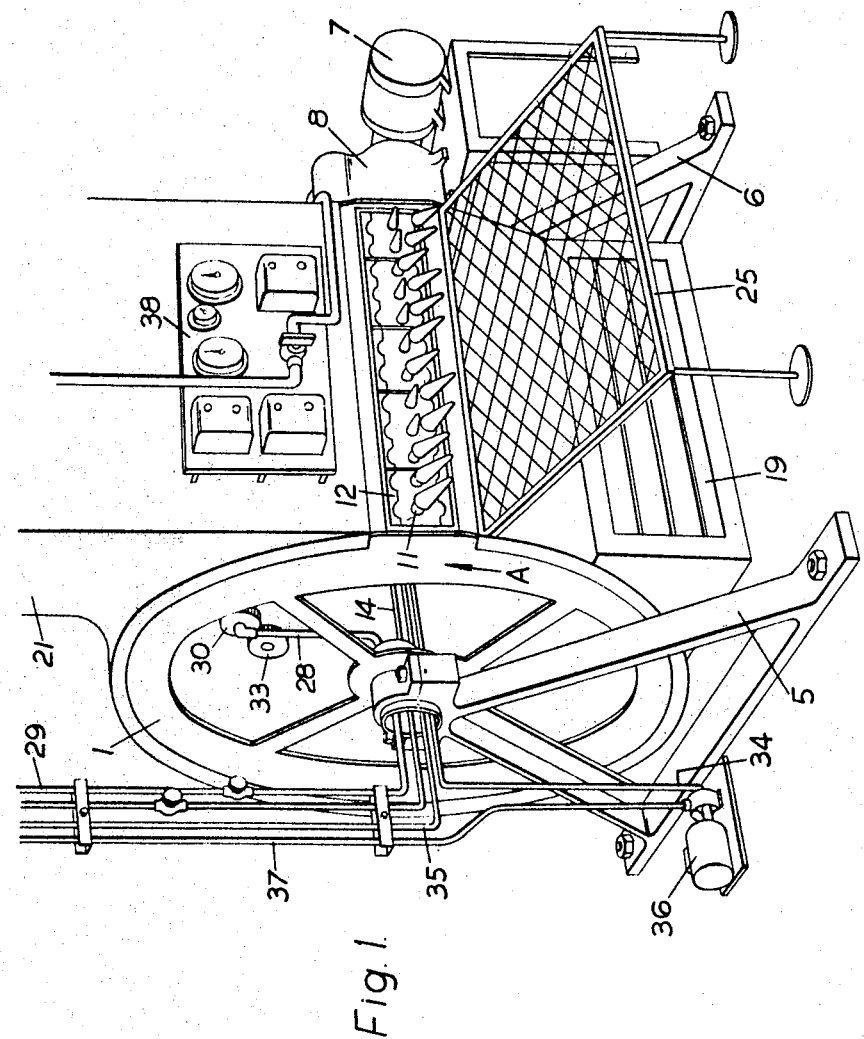
FIGURE 1 represents diagrammatically a front perspective view of the machine showing a batch of cooked cone biscuits being ejected.
Figure 2:
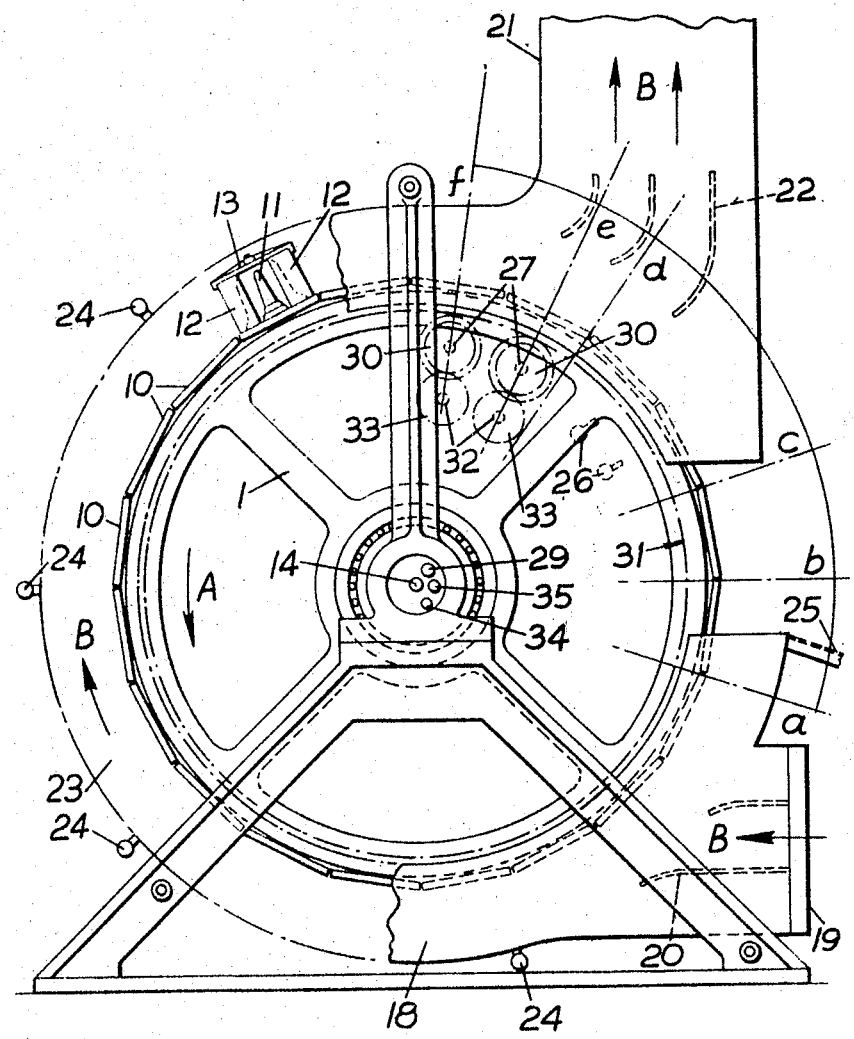
FIGURE 2 represents diagrammatically an end view of the machine with a gas and air ducting cut away and showing one set only of upper guides and outer and inner moulds.
Figure 3:
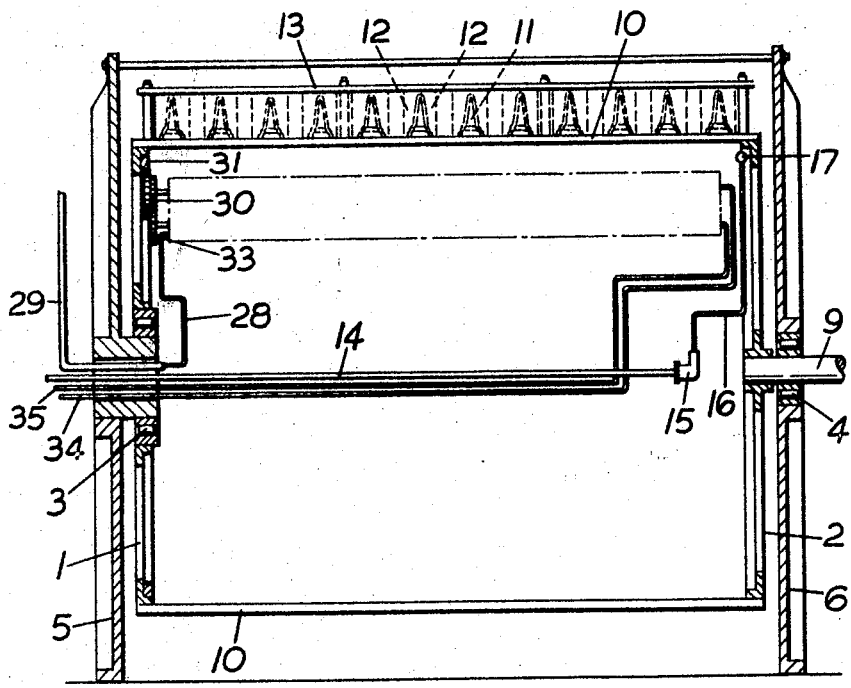
FIGURE 3 represents a vertical longitudinal section through the machine, also showing one set only of upper guides and outer and inner moulds.
Figure 4:
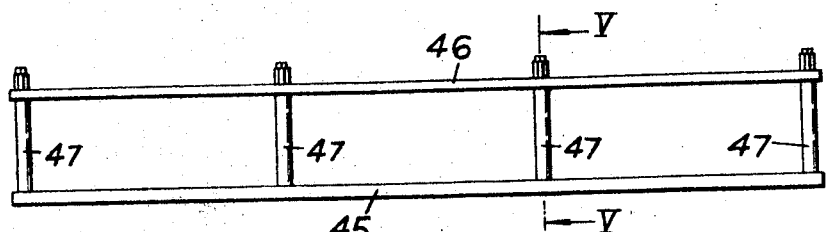
FIGURE 4 is an elevation of a bedplate and upper guide plate assembly for supporting a pair of mould carriers.
Figure 5:
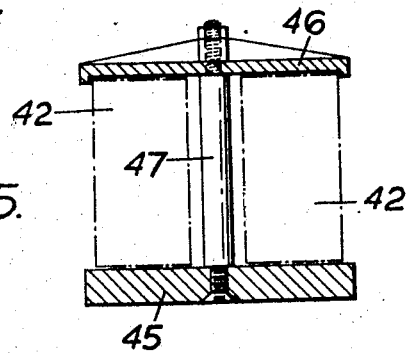
FIGURE 5 is a section on the line V—V in FIGURE 4 on a larger scale.

Referring first to FIGURES 1 to 3, there is indicated a drum whose end plates 1, 2 are rotatably mounted through bearings 3, 4 in end frames 5, 6, the drum being rotated about a horizontal axis at uniform speed slowly and continuously in the direction of arrow A by a motor 7 driving through reduction gear 8 the trunnion 9 on which end plate 2 of the drum is mounted. The circumferential wall of the drum is formed by a series (for example twenty) bedplates 10 secured longitudinally between the end plates 1, 2 with the spaces between them closed by insulation material. Upon each bedplate 10 is mounted a set (for example twelve) of inner moulds or cores 11, outer mould halves 12 and upper guides 13 for the latter. In FIGURE 2 the outer mould halves are shown open to reveal the core 11, but in practice they would be closed at this point in their circular path.

The outer mould halves 12 are arranged to be opened and closed by pneumatic power at predetermined points of the drum's rotation under control of valve-actuating devices (not illustrated) which are located on the drum and which are operated by their contact with abutments on a stationary part of the machine as will be readily understood. Compressed air is supplied through pipe 14, swivel joint 15 and feed arm 16 to a ring main 17 which is secured to end plate 2 and from which pipes lead to the rams or other means for operating the mould halves. The air pipe 14 and other service pipes enter the drum through the hollow centre of frame 5 and end plate 1.

One construction of such bedplates, outer moulds and mould-operating means is described later in this specification with reference to FIGURES 4 to 11.

As indicated in FIGURES 1 and 2, the drum is surrounded by a suitably insulated casing 18 which partly closes the ends and which has an air inlet 19 with deflectors 20, and an exhaust outlet 21 with deflectors 22, forming a duct or chamber 23 which constitutes the cooking area and which extends around approximately three quarters of the drum circumference. The air passes through this duct or chamber where it is joined by the products of combustion from a series of longitudinal rows of gas jets 24, passing in the direction of arrows B counter to that of the drum so that it heats the outer moulds containing the mix to the correct cooking temperature. A gap along the front of the casing 18 allows the cooked cones to be ejected from the moulds onto an inclined wire mesh receiving tray 25.

The inner moulds, after ejection of the cooked cones, are re-heated mainly by auxiliary gas jets 26 supplied through a gas pipe (not shown) entering the interior of the drum with the other service pipes. Also the inner moulds are provided with ejector means which can be operated by compressed air from ring main 17 to eject the cooked cones when the outer moulds are opened. A convenient construction and arrangement for introducing the mix into the moulds and for ejecting the cooked cones is described later in this specification with reference to FIGURES 12 to 19.

The mix is fed to the moulds from the inside of the drum by an arrangement of nozzles, feed mouths or the like aligned so as to be capable of registering with the inlet openings to the moulds as each set of moulds passes the feed position. These nozzles (not shown), which connect with said inlet openings and move round therewith during the short time of mix injection, are carried on pump or injector devices indicated at 27 (FIGURE 2) supported within the drum but separately therefrom and supplied with the mix via pipes 28, 29 from an overhead supply tank. The devices 27 are operated at appropriate times determined by a control device or devices which is phased with the rotation of the drum. A convenient arrangement of mix-injecting means is described later in this specification with reference to FIGURES 20 to 22 and is represented in FIGURES 1 to 3 by the pumps 27 driven through gears 30 from a ring gear 31 secured to end plate 1 and by cam devices 32 driven by gears 33 from gears 30. Since the pumps 27 in this arrangement occupy too much space to be placed in a single longitudinal row, they are indicated in FIGURE 2 as being split into two rows so as to charge alternate moulds in each row but acting simultaneously.

To keep the mix from becoming too hot before it is fed into the moulds, the devices 27 have cooling water circulated around them via pipes 34, 35 by a circulating pump 37 with a flow pipe 37 leading from a reservoir.

Suitable control devices, indicators and the like such as are shown on the control panel 38 in FIGURE 1 will be provided for predetermining the speed of the drum which automatically controls the timing and sequence of the mould opening and closing, ejecting, filling and cooking operations, for controlling the cooking temperature by adjusting the gas pressure and/or the exhaust fan, and for varying the speed or capacity of the cooling water pump. If desired, suitable thermostats or other heat-sensitive devices may be incorporated, as will be well understood by those aquainted with automatic control systems.

With the arrangement of machine above described it is contemplated that the constant speed of revolution of the drum will be such that cooking of the cones in the closed moulds will proceed during about three quarters of a revolution. This is indicated on FIGURE 2 as extending from point $f$ to point $a$ which occupies 58 seconds. From point $a$ where the outer mould halves open to point $b$ where ejection of the cooked cones takes place occupies 4 seconds. After a further 4 seconds from point $b$ to point $c$ the inner moulds are heated for 8 seconds until the outer moulds close at point $d$. After a lapse of 2 seconds, feeding of the mix to the moulds on two adjacent bedplates simultaneously commences at $e$ and $f$ and occupies 4 seconds.

Thus each recolution of the drum takes 80 seconds during which time all twenty sets of moulds have produced twelve cones each. This sequence or cycle of operations is repeated continuously as long as the supply of mix lasts. It will be understood, of course, that the above times are given merely by way of example and relating to ice cream cones and that the timings and speed of production will depend upon the kind and size of container to be produced.

The heat for cooking the mix and/or for heating the moulds may be provided electrically instead of by gas. Also, as an alternative to pneumatic operation of the outer mould halves and the ejection means, mechanical or electrical operation may be arranged for (e.g. solenoids).

It will be observed that, by arranging for all the operations in the cycle to take place while the drum is rotating at uniform speed, the drive means for the drum is simple.

Figure 6:
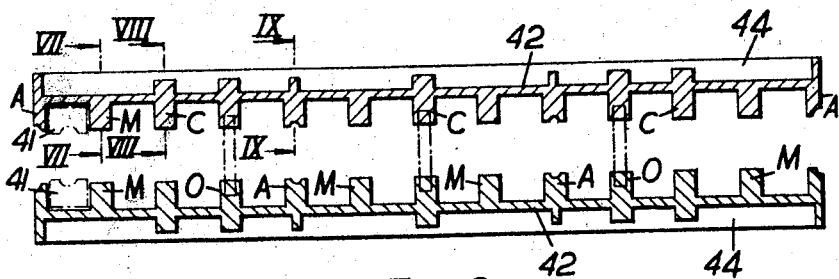
FIGURE 6 is a sectional plan of a pair of carriers shown in the open position.
Figures 7, 8, 9:
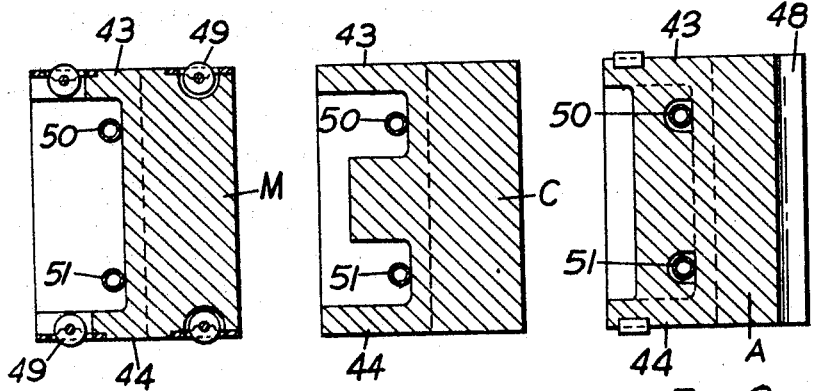
FIGURES 7, 8 and 9 are sections taken respectivley on the lines VII—VII, VIII—VIII and IX—IX in FIGURE 6 on a larger scale.
Figure 10:
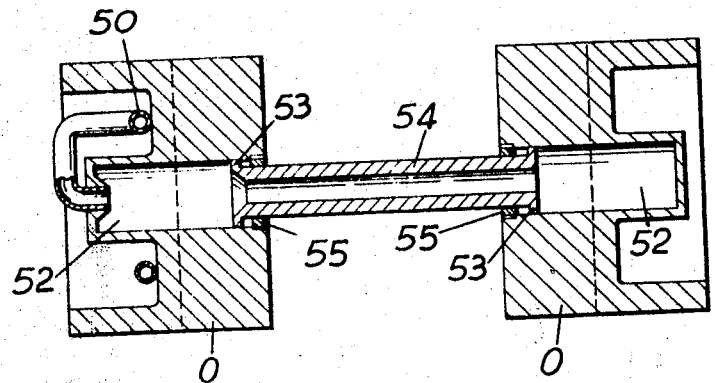
FIGURE 10 is a cross section on a larger scale through the carriers of FIGURE 6 taken at a point where an opener ram and cylinder assembly is incorporated.
Figure 11:
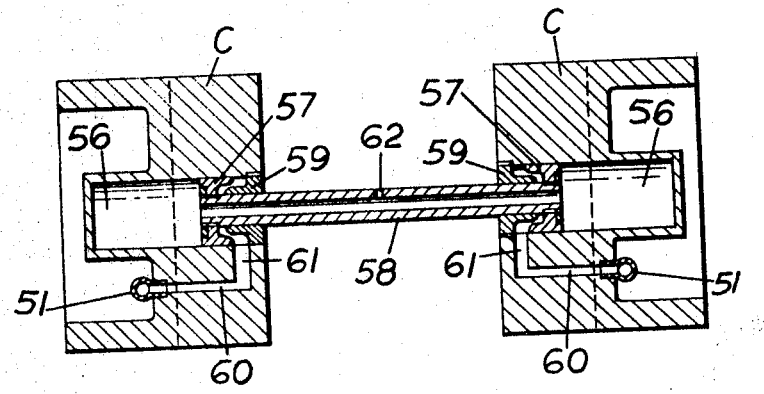
FIGURE 11 is a similar view to FIGURE 10 but taken at a point where a closer ram and cylinder assembly is incorporated.

Referring now to FIGURES 4 to 11, the outer mould halves 41, of which one pair only is indicated in FIGURE 6, are held in recesses in the opposed faces of two identical mould carriers 42. Each carrier has an upper and a lower flange 43, 44 which fit slidably between a bedplate 45 adapted for securing on the rotary drum and an upper guide plate 46 which is secured to and in spaced relationship from the bedplate by alignment columns 47. Items 41 and 45 are designated generally in FIGURES 1 to 3 by reference numerals 12 and 10 respectively.

The carriers 42 have two series of complementary ribs. The ribs marked A have small recesses 48 to engage with the columns 47 when the outer moulds are closed to assist correct registering and prevent bending of the carriers (see FIGURE 9). These ribs may also carry wheels (not shown) which engage end flanges (not shown) on the upper guide plate to ensure endwise alignment of the two carriers with one another. The ribs marked M (see FIGURE 7) and the flanges 43, 44 opposite to them carry wheels 49 which project slightly to bear upon the bedplate and the upper guide plate to ensure easy movement of the carriers. The ribs marked O and C house or incorporate pneumatic ram and cylinder assemblies which will be termed "openers" and "closers" for respectively opening and closing the mould carriers, compressed air being led to these from one end of the carrier pair by pipes 50, 51 passing through the intervening ribs.

Each opener (see FIGURE 10) consists of two "cylinders" 52 which may actually be rectangular in cross section and in which work the rams 53 of a double-ended common ram rod 54 working through end packings 55. One cylinder is closed at its rear end and communicates through the hollow ram rod 54 with the other cylinder to which is coupled to air pipe 50. Admission of air to these openers forces the two carriers apart to the position shown in FIGURE 10 and thereby opens the outer moulds. Two such openers are indicated in FIGURE 6 in the ribs O. These openers or the air pipe connected to them is provided with a slow bleed-off arrangement (not shown) to give a cushioning effect during the closing of the moulds.

Each closer (see FIGURE 11) consists of two "cylinders" 56 similar to the cylinders 52 and having rams 57 secured on a common ram rod 58 which works through end packings 59 secured in the cylinders ends, the air pipes 51 being connected via ducts 60 in the carriers to ports 61 between the rams and their end packings. Admission of air to these closers (shown in the open position in FIGURE 11) forces the carriers towards one another to close the moulds, air being expelled through the hollow ram rod and an aperture 62 therein from behind the rams whilst air is similarly drawn in on the reverse movement when, as the openers operate, air is expelled from the cylinders through pipes 51. Three such closers are fitted in the ribs C, one being indicated in FIGURE 6.

The operation of these openers and closers will be controlled by suitable valves conveniently located, for example beneath the bedplates 45, and arranged for actuation, at predetermined times in the cycle of operations of the machine, by levers or other devices as the drum rotates, such a control system being readily devised to suit the machine on which the mould carriers are mounted.

Instead of using alignment wheels for locating the carriers longitudinally in their supporting assemblies, this could be achieved by providing on the upper flanges 43 nibs or other projections which slidably engage in transverse slots in the upper guide plate 46.

It will be understood that the materials used for these parts of the machine will be chosen to withstand the cooking heat in which the parts have to operate.

Figure 12:
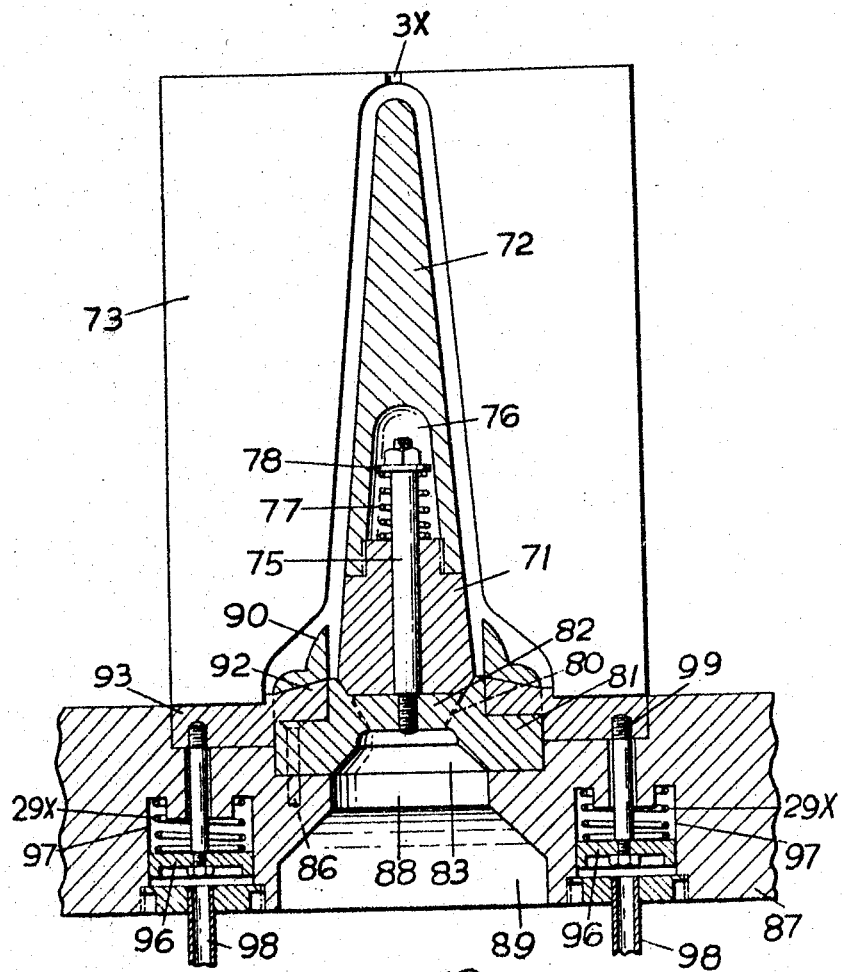
FIGURE 12 is a vertical section showing an inner mould or core mounted on a bedplate with ejector means for the cone, an outer mould half being shown in its closed position round the core.
Figure 13:
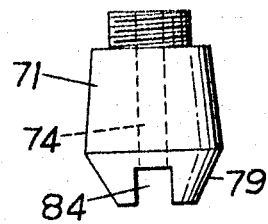
FIGURE 13 is an elevation seen at right angles to FIGURE 12 of a core body shown in the latter figure.
Figure 14:
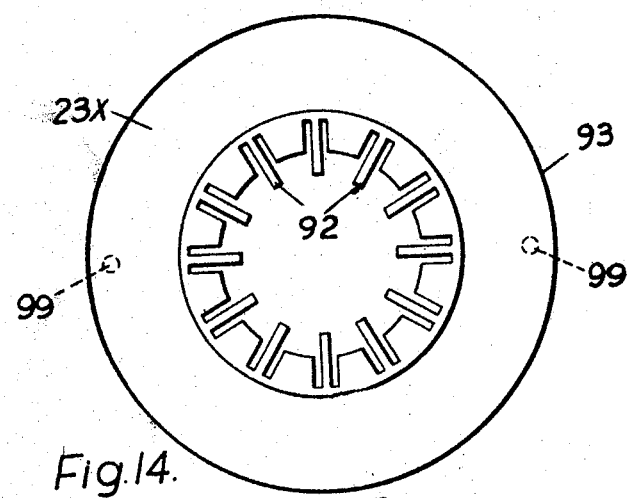
FIGURES 14 and 15 are respectively a plan and elevation of an ejector plate.
Figure 15:
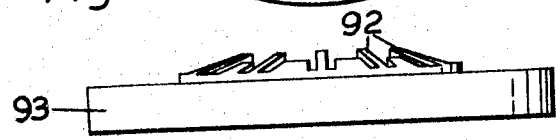
Figure 16:
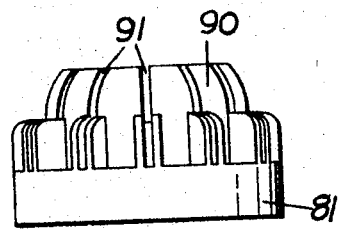
FIGURES 16 and 17 are respectively a plan and elevation of a fixed insert.
Figure 17:
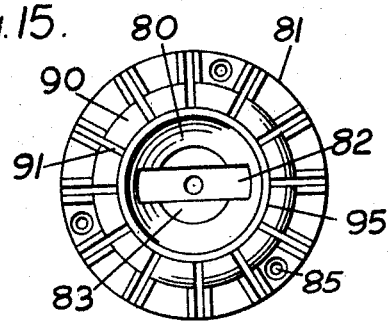
Figure 18:
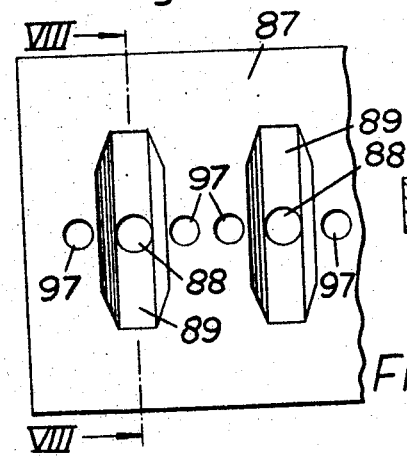
FIGURE 18 is an underplan on a reduced scale of a portion of the bedplate shown in FIGURE 12.
Figure 19:
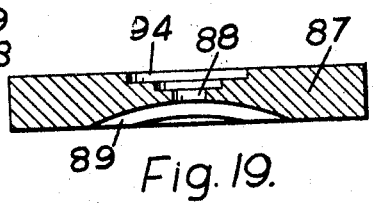
FIGURE 19 is a section on the line XVIII—XVIII in FIGURE 18.

Referring next to FIGURES 12 to 19, the core (indicated generally by reference 11 in FIGURES 2 and 3) consists of a core body 71 with a bonnet cover 72 screwed thereon, these having their outer surfaces shaped to cooperate with the outer mould halves 73, one of which is shown in FIGURE 12, to produce the required cone body shape. The core body 71 has a central bore 74 by which it fits slidably upon a spindle 75 which projects into the hollow lower end 76 of the bonnet and is there surrounded by a compression coil spring 77 held between the core body and a collar 78 on the spindle. This spring urges the frusto-conical base 79 of the core body 71 against a correspondingly shaped seating 80 in an annular insert 81, the spindle being screwed into a cross-bar 82 which spans an inlet opening 83 in the insert, the body 71 having a slot 84 fitting over the cross-bar 82 to enable the body to act as a valve. The insert 81 has holes 85 for screwed studs 86 by which it is secured to the bedplate 87 which corresponds to one of the items 10 in FIGURES 2 and 3.

The mix is fed into the mould by injecting it under pressure through the inlet opening 83, the mix forcing the core base off its seating 80 against the spring pressure. The inlet opening 83 is in register with a feed aperture 88 formed at the top of an arcuate channel 89 which is located in the underside of the bedplate and which cooperates with the nozzle of a feed pump device for the mix.

The crown of the insert 81 has radially disposed fins or tongues 90 with intervening slots or gaps 91 to mould the desired shape of the interior of the cone top, but it is to be understood that the shape of the insert crown will vary with different cores to suit the desired cone shape. The slots 91, however, also serve to receive with an easy fit corresponding fins 92 on a circular ejector plate 93 which seats into a recess 94 in the bedplate and surrounds the insert 81. When the outer moulds 73 are opened, axial movement of the ejector plate pushes the cooked cone off the core by engaging all flat surfaces of the cone top except the inner rim thereof which is defined by the circular rim 95 of insert 81.

The operation of the ejector plate 93 is by ejector rams 96 working in pneumatic cylinders 97 which are mounted in the rear of the bedplate and are coupled by pipes 98 to a compressed air supply through a suitable control valve arranged to be actuated automatically at predetermined times by actuator devices as the bedplate travels along its path. The rams have their rods secured at 99 to the ejector plate 93 which is normally held down in the recess 24 by return springs 29X. The upper annular surface 23X of the ejector plate serves as a locating seating for the outer mould halves.

With the above described construction, when the feed openings 83, 88 register with the feed nozzle of the pump device the slight pressure of mix raises the core off its seating 80 and fills the mould space with a measured quantity. The core seats back under pressure of spring 77 and is held there by expansion of the mix and formation of steam during cooking. A small vent 3X in the centre of the outer mould halves allows for escape of cooking gases and for any over expansion of mix, which will form a bubble and be burnt off.

Figure 20:
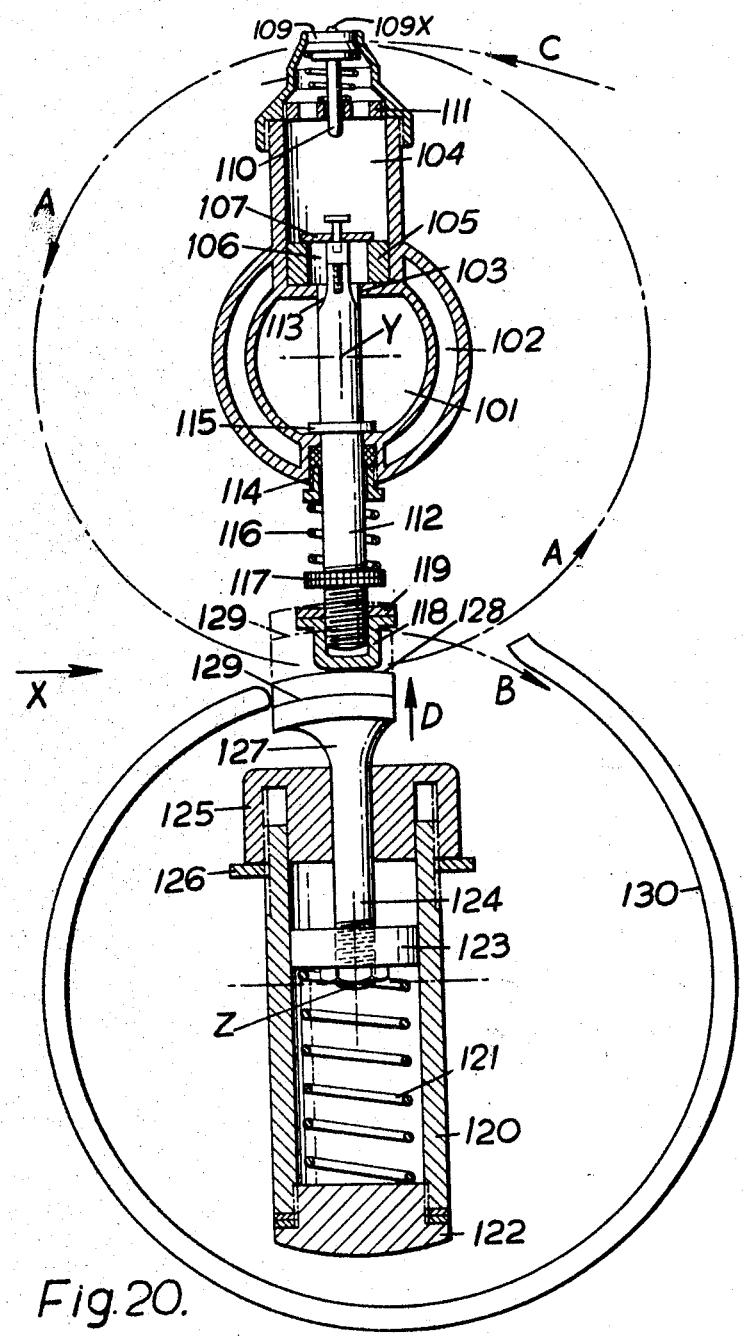
FIGURE 20 represents a cross-section through the pump and its actuator means, all supports therefor being omitted.
Figure 21:
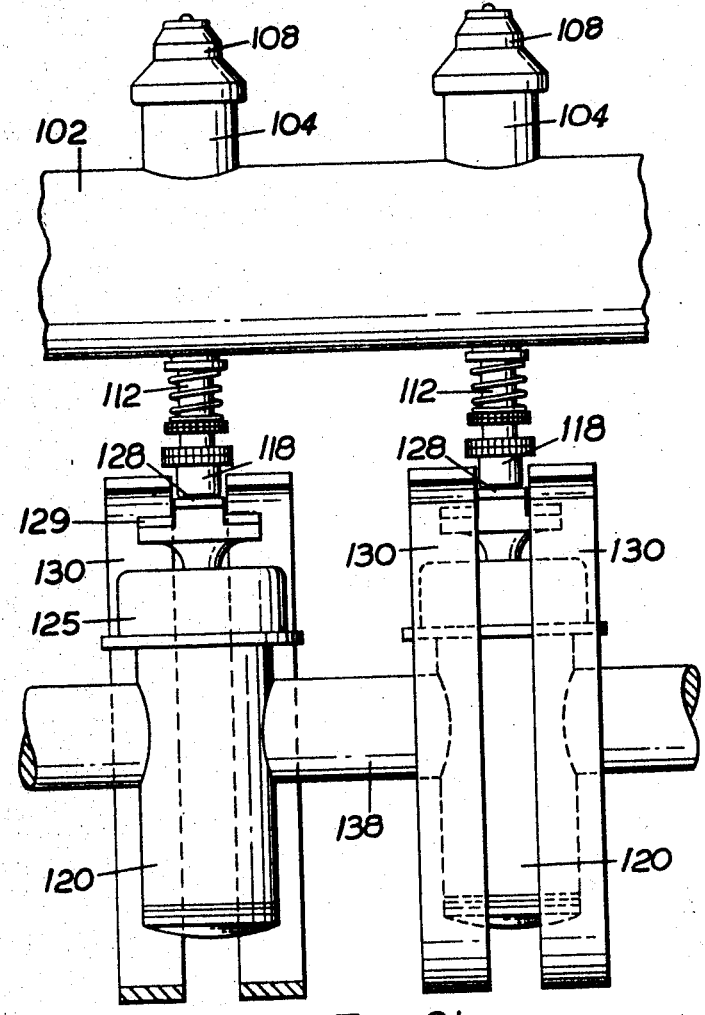
FIGURE 21 represents an elevation of the mechanism shown in FIGURE 20 seen in the direction of arrow X therein.
Figure 22:
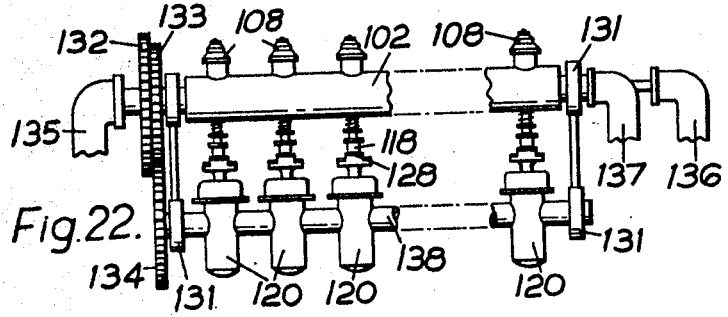
FIGURE 22 represents a broken elevational view of a series of the pump and actuator units of FIGURES 20 and 21 indicating the driving means therefor and the pipe services thereto.

Referring finally to FIGURES 20 to 22, each pump, such as those indicated generally in FIGURES 1 to 3 by reference 27, has a feed chamber 101 to which mix is supplied and this is surrounded by a jacket 102 through which cooling water is circulated. This feed chamber communicates through a transfer port 103 with a plunger chamber 104 in which works a plunger 105 having ducts 106 through it closable by a suction plate valve 107.

The plunger chamber 104 has secured on its outer end a discharge nozzle 108 housing a spring-closed discharge valve 109 whose stem 110 is guided in a spider 111. The plunger rod 112 has fluted suction inlet ducts 113 and its lower part is guided in a gland 114, there being a stop collar 115 to limit its outward movement which is produced by a return spring 116 located between the gland nut and adjustable screwed collars 117. On the outer end of the rod 112 is screwed a contact device in the form of an end cap 118 with smooth round contour and with a stroke-adjusting nut 119 to locate it.

The above described pump is mounted for rotation about centre Y so that its discharge nozzle rotates through the path indicated by arrow A.

The pump actuator consists of a body 120 housing a thrust spring 121 which is compressed between an end cap 122 and a piston 123 secured on a thrust rod 124. This rod is slidable through a bush 125 which is screwed on the body 120 and which limits the radially outward travel of the piston, the bush having a locknut 126 and forming an adjustable stop for the rod 124.

The rod 124 has a head 127 with a central curved thrust face 128 flanked by two cam follower faces 129. These cam faces 129 co-operate with a pair of fixed cam guide rings or compressor spirals 130 one pair being cut through on the left of FIGURE 21. The thruster or cam unit is mounted for rotation about centre Z and in the direction of arrow B at the same surface speed as that of the end cap 118 of the pump unit and a gap in the spirals allows the thruster head to engage said cap each time these two members oppose one another.

The operation is as follows. As the pump unit rotates into the position of FIGURE 20 where nozzle 108 registers with the mould which is rotating in the direction and path of arrow C, the thruster unit has reached the illustrated position in which the thruster head 127 is freed from the compression spirals off which the faces 129 have passed. The head will now be pushed into the broken line position in the radial direction of arrow D and will thrust the pump rod to cause a charge of mix to be ejected substantially instantaneously from chamber 104 into the mould, valve 109 having been opened by contact of its nose 109X with the end of the core spindle 75 of the mould core (see FIGURE 12). On continued rotation the cam faces 129 re-enter the spirals which gradually return the thruster head, and the pump plunger 105 returns to its inner position, allowing a fresh charge of mix sucked into chamber 104 to pass through the plunger ready for the next injection.

As shown in FIGURE 22, the desired number per row of said pump units each with its plunger unit is mounted in bearings 131 supported inside the rotary mould drum and rotated through gear wheels 132, 133, 134 from the ring gear 31 (see FIGURE 2) on the drum. The mix is led into the chamber 101 surrounded by the jacket 102, both of which are common to all the pump units in one row, through a pipe 135 with swivel connections, and likewise the cooling water is circulated through pipes 136, 137. The plunger devices for each row are mounted on a common cam shaft such as 138. There will be two rows each of six pump mechanisms in this example of machine as explained with reference to FIGURE 2. The compression spirals are omitted from FIGURE 22 for the sake of clarity.

It will be understood that the pump casing and cam shaft are driven at such a speed relative to that of the drum that each successive row of moulds is fed whilst on the move as it slowly passes the feed point, the pump nozzles being accurately registered with each row of moulds in turn.

I claim:

1. Machine for producing ice-cream cones, bakers' cups or like edible containers which are moulded from batter or other suitable mix and are cooked in said moulds, including a drum which is rotatable about a horizontal axis and carries around its circumference a series of mould sets comprising inner moulds and split outer moulds, driving means to rotate said drums continuously at uniform speed, heating means for said moulds, means for opening and closing said outer moulds, means for feeding mix to said moulds which include nozzles, means for ejecting the cooked containers from said moulds, bedplates which extend longitudinally around the drum circumference, and mechanism for control therefor which is arranged to cause the operation of all of said means in predetermined sequence and timed relationship whereby the continuous production of containers can proceed automatically so long as the supply of mix is maintained and wherein said mould sets are mounted in longitudinal rows upon the outer faces of said bedplates, said moulds having inlet openings through which the mix is fed from the inside of the drum, said feed nozzles being arranged to connect with said inlet openings and to move around therewith during the short time of mix injection.

2. Machine according to claim 1, characterised in that said drum is substantially surrounded by a casing (18) having an air inlet (19) and an exhaust outlet (21) and forming with said bedplates a duct or chamber (23) constituting the cooking area through which said moulds are arranged to be carried in contra-direction to a flow of hot gases passing through said duct or chamber.

3. Machine according to claim 1 including heating means (26) located within the drum and arranged to heat said inner moulds directly when said outer moulds are open.

4. Machine according to claim 3, characterised in that the outer surface of said ejector member (93) serves as a locating seating for said outer mould halves (73).

5. Machine according to claim 1, characterised in that the outer mould halves of each of said mould sets are arranged in two rows extending respectively along the opposed faces of two mould carriers (42) which are mounted between one of said bedplates (10, 45) and an upper guide plate (46), said plates extending parallel to said carriers and transverse to the path of travel of the mould set, there being provided two or more sets of ram and cylinder assemblies (52, 53) (56, 57), at least one set being for opening said moulds and at least one set being for closing said moulds, including means for conducting to said ram and cylinder assemblies pressurized fluid and means for controlling their action so as to open and close said moulds at predetermined times.

6. Machine according to claim 5, characterised in that said opposed faces of each pair of said mould carriers (42) have two sets of complementary ribs which are spaced apart longitudinally of the carriers to form recesses which are adapted to hold said mould halves, some of said ribs being adapted to house said ram and cylinder assemblies, and some being arranged to engage with alignment columns (47) supporting said upper guide plate (46) from said bedplate (45) to ensure correct registering of said mould halves when the latter close.

7. Machine according to claim 6, characterised in that each of said ram and cylinder assemblies comprises two cylinders located respectively in two complementary ribs and two rams one on each end of a common ram rod (54) (58) which has a passage longitudinally therethrough, each assembly for opening the moulds having one cylinder connected to the pressurised fluid, and each assembly for closing the moulds having both cylinders connected at one end of each to the pressurised fluid and open at the other end of each to atmosphere through a passage extending longitudinally through said ram rod.

8. Machine according to claim 1, characterised in that each core or inner mould (11) is mounted upon its bedplate so as to be axially movable to open or close a mix inlet through which the mix can be forced, the core being spring-urged into the closed position and acting as a valve.

9. Machine according to claim 8, characterised in that the base (79) of each core acts as the movable member of said valve and works to a seating (80) in a seating member (81) which is secured to said bedplate and which surrounds a mix inlet aperture therein, the core being supported for limited axial movement upon a spindle (75) secured centrally to said seating member (81).

10. Machine according to claim 9, characterised in that said mix inlet aperture is adapted for connection intermittently with a pressurised mix supply each time the continuously moving bedplate reaches its mix-feeding position.

11. Machine according to claim 10, characterised in that an ejector member (93) surrounds said seating member (81) and is arranged to be moved in the axial direction of the core by ram and cylinder units (96, 97) to eject a cooked container from the mould when said outer mould halves are open.

12. Machine according to claim 11, characterised in that said ejector member has fins (90), which move axially within corresponding slots (91) in said seating member during ejection.

13. Machine according to claim 12, characterised in that interengaging parts of said ejector member (93) and said seating member (81) are arranged to produce part of the moulded shape of the container.

14. Machine according to claim 1, characterised in that said mix-feeding means includes a plunger pump arranged to be rotated bodily so that its discharge nozzle (108) can temporarily connect with said inlet opening of the moving mould during a minor portion of the pump's revolution, and actuator means for actuating the pump plunger (105) to feed the predetermined quantity of mix under pressure to said mould during the short time the pump and mould are thus connected, said actuator means including a rotary cam device which is arranged to be driven in timed relationship to the rotation of the pump and which has a radially movable spring-loaded thruster device arranged for rotation within a cam guide ring or compressor spiral (130), whereby said thruster device is constrained during most of each revolution by said guide ring or spiral but is released momentarily through a gap in the latter to actuate said pump plunger substantially instantaneously and is thereafter guided back into said guide ring or spiral to cause re-loading of said thruster device spring (21).

15. Machine according to claim 14, characterised in that said thruster device has a head (127) on which is a curved thrust face (128) to act upon said pump plunger (105) through a cap (118) on a plunger rod (112), said head also having at least one curved cam face (129) to co-operate with said cam guide ring or compressor spiral (130).

16. Machine according to claim 14, characterised in that said pump discharge nozzle (108) has a valve (109) adapted to be opened against spring pressure by its engagement with a member on the mould.

17. Machine according to claim 14, including a chamber (101) for the mix surrounded by a hollow jacket (102) through which cooling fluid is circulated, said mix chamber (101) communicating with a chamber (104) in which works said plunger (105) and into which a predetermined charge of said mix is sucked during the expulsion of the previous charge through said discharge nozzle (108).

References Cited
UNITED STATES PATENTS 1,191,485    7/1916    Tompkins _____ 107—58

WILLIAM I. PRICE, Primary Examiner

ARTHUR O. HENDERSON, Assistant Examiner

U.S. Cl. X.R.

99—383